United States Patent [19]
Dawson et al.

[11] 3,859,148

[45] Jan. 7, 1975

[54] EPITAXIAL CRYSTAL GROWTH OF GROUP III-V COMPOUND SEMICONDUCTORS FROM SOLUTION

[75] Inventors: Larry Ralph Dawson, Summit; Orval George Lorimor, Warren Twp., Somerset County; Robert H. Saul, Scotch Plains, all of N.J.

[73] Assignee: Bell Telephone Laboratories Incorporated, Murray Hill, N.J.

[22] Filed: Dec. 1, 1972

[21] Appl. No.: 311,240

[52] U.S. Cl. .......... 148/172, 148/171, 252/62.3 GA, 117/201, 118/415, 23/301, 29/569

[51] Int. Cl. .......... H011 7/38

[58] Field of Search ..... 148/171, 172; 252/62.3 GA; 117/201; 118/415, 421

[56] References Cited

UNITED STATES PATENTS

| | | | |
|---|---|---|---|
| 2,462,218 | 2/1949 | Olsen | 148/189 UX |
| 2,727,839 | 12/1955 | Sparks | 148/171 X |
| 3,584,267 | 6/1971 | Logan | 148/171 X |
| 3,589,336 | 6/1971 | Bergh | 148/171 X |
| 3,600,240 | 8/1971 | Rupprecht et al. | 148/171 |
| 3,669,767 | 6/1972 | Hackett et al. | 148/171 |
| 3,690,964 | 9/1972 | Saul | 148/171 |
| 3,690,965 | 9/1972 | Bergh et al. | 148/171 |
| 3,705,825 | 12/1972 | Touchy et al. | 148/1.5 |

*Primary Examiner*—G. Ozaki
*Attorney, Agent, or Firm*—G. S. Indig; A. N. Friedman

[57] ABSTRACT

Epitaxial layers of Group III–V compound semiconductor materials are grown from solution simultaneously on several substrate wafers. The wafers are held in the growth vessel in pairs, contacting one another at a broad face so as to prevent penetration of the solution between them. Each pair is held with its broad faces essentially parallel to broad faces of the adjacent pairs and separated from the adjacent pairs by, preferably,from 0.1 to 3 millimeters. To accomplish epitaxial growth a nutrient solution is caused to fill the interpair spaces and the temperature of the growth vessel is progressively lowered. Gap red-emitting diodes with electroluminescent efficiencies as high as 9 percent have been produced using this method for production of successive n and p epitaxial layers.

14 Claims, 3 Drawing Figures

EPITAXIAL CRYSTAL GROWTH OF GROUP III-V COMPOUND SEMICONDUCTORS FROM SOLUTION

BACKGROUND OF THE INVENTION

1. Field of the Invention

The invention concerns the growth of epitaxial crystalline layers of Group III–V compound semiconductors from a nutrient solution.

2. Description of the Prior Art

The liquid phase epitaxy method for growing a layer of a semiconductor material on a crystalline substrate has been shown to be useful for the fabrication of devices using Group III–V compound semiconductors (i.e., the Group III–V compound semiconductors and their ternary combinations). This method has come into wide spread use in conjunction with the GaAs––GaP materials in which there is increasing commercial interest (RCA Review, 24 (1963) 603; *Journal of Applied Physics*, 39 (1968) 2747). The method, basically, involves the formation of a saturated solution of the compound semiconductor in an additional quantity of its Group III constituent, bringing the saturated solution into contact with the substrate and reducing the temperature of the solution and substrate in order to cause deposition onto the substrate of the dissolved semiconductor material and such other species as are included as dopants.

A number of methods have been employed in bringing the solution into contact with the substrate. The above two references utilize what has become known as the tipping method. In this method the solution is contained in one section of the growth boat and the substrate held in another section. After the temperature has been raised to an initial temperature the growth boat is tipped and the solution flows to the other end covering the substrate. A method involving the 360° rotation of the growth boat is disclosed by Donahue (*Journal of Crystal Growth*, 7 (1970) 221). In this reference Donahue also discloses some of the advantages of restricting the thickness of the solution layer in contact with the substrate. He states, however, that he was not able to get the solution to flow into a space less than about 3 millimeters wide. Teaching the advantages of growing epitaxial semiconductor layers from solution layers 3 millimeters thick or less, Bergh et al. (U.S. Pat. No. 3,690,965, issued Sept. 12, 1972) solve the problem of bringing a thin layer of solution into contact with the substrate by using a system of sliders in order to slice off an aliquot of solution from a solution reservoir. In the exemplary Bergh apparatus the simultaneous growth of crystalline layers on several substrates requires the sequential slicing off of aliquots at each reservoir aperture. This requirement imposes some limitations on the compactness of the growth apparatus, thus, some limitations on the device output of a furnace of given size.

SUMMARY OF THE INVENTION

An apparatus has been developed which enables the simultaneous deposition of crystalline layers on a plurality of semiconductor substrates, each of which is contacted with a solution layer which is preferably not more than 3 millimeters thick. The apparatus is well adapted to the large volume production of p-n junction semiconductor slices, exemplary holders being capable of simultaneously processing over 100 1½ inch diameter substrates in a furnace with a 5 inch long zone of essentially uniform temperature. The substrates are supported in the growth boat in pairs with the substrate faces, upon which essentially no deposition is desired, contacting one another so as to essentially prevent flow of the nutrient solution between them. Each pair is supported with its broad faces supported parallel to the broad faces of the adjacent pairs and separated from them by a predetermined spacing which defines the thickness of the solution layer from which epitaxial crystalline layers will be grown.

The growth boat has a chamber, separate from the portion of the boat holding the substrates, in which the constituents of the nutrient solution are initially placed. After the growth boat is raised in temperature to the initial growth temperature and held there for a time period to allow the dissolving of the semiconductor and dopants and the homogenization of the resulting solution, the solution is caused to flow into the space between the substrate pairs. It is considered that the flow of the solution in between the substrate pairs is aided by the fact that the solution wets the substrates. Crystalline layer growth is accomplished by the progressive reduction of the temperature of the solution and substrates. Growth is terminated by causing the solution to flow from the space between adjacent pairs. Red-emitting gallium phosphide electroluminescent diodes have been made from p-n junction wafers produced by a double epitaxial process in which both p-type and n-type crystalline layers were grown in such an apparatus. Diodes fabricated from the slices so processed possessed electroluminescent quantum efficiencies as great as 9 percent.

DETAILED DESCRIPTION OF THE INVENTION

The Apparatus

Figure 1:
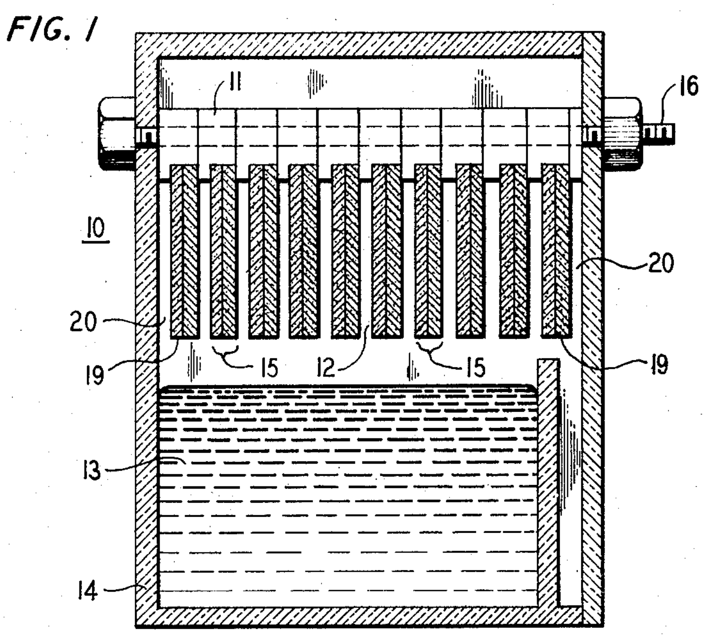
FIG. 1 is an elevational view in section of an exemplary liquid phase epitaxy growth boat in which 20 semiconductor slices can be simultaneously processed.
Figure 2:
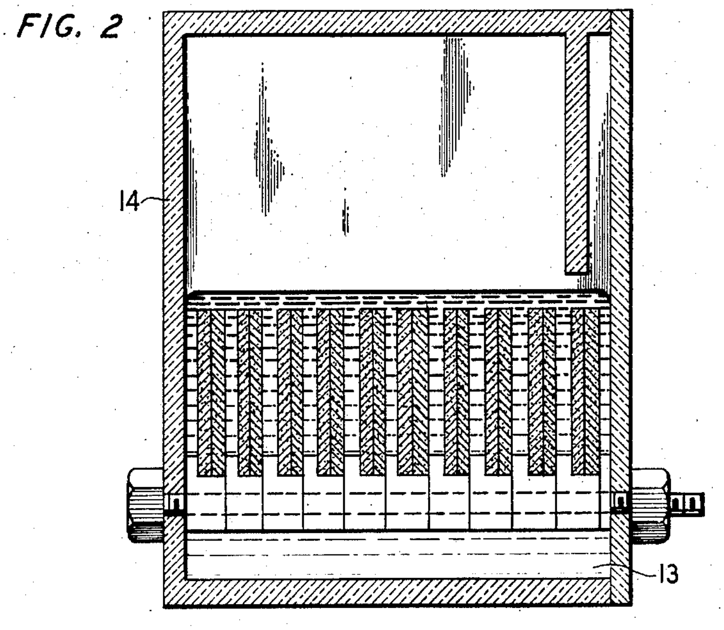
FIG. 2 is an elevational view in section of a growth boat as shown in FIG. 1, after the boat has been rotated by 180° in order to flow the nutrient solution simultaneously between the substrates.

The exemplary growth boat 10 depicted in FIG. 1 is constructed of materials such as graphite and fused silica. In the upper portion of the growth boat 10 an array of clamps 11 (depicted in greater detail in FIG. 3) holds pairs 15 of semiconductor substrate wafers so that each pair is held together and supported parallel to the adjacent pairs. The interpair spacing 12 is fixed by the construction of the clamp 11. The nutrient solution 13 is held in a chamber or reservoir 14 separate from the substrates 15 during the warm up and equilibration of the furnace and growth boat 10. When the boat is rotated so as to change its orientation the solution flows in between the substrate pairs 15 as shown in FIG. 2 forming a solution layer between each pair. The use of solution layers 3 millimeters or less in thickness is preferred for the suppression of irregular layer growth due to constitutional supercooling. The use of these small spacings is also economical in reducing the quantity of solution constituents required per substrate.

Interpair spacings no less than 0.1 millimeters in thickness are preferred in order to permit the deposition of a usefully thick crystalline layer on the substrate wafer. In the interest of maintaining slice-to-slice uniformity the two end wafers 19 can be dummies or the two end spacings 20 can be reduced to approximately half spacing.

In this growth system crystalline layer growth is accomplished by the progressive reduction of the temperature of the growth boat and its contents. Layer growth is terminated by rotation of the boat to its initial position as depicted in FIG. 1. The use of such a growth boat is particularly economical when 10 or more substrates are simultaneously processed. The growth boat 10 can be closed, as shown, when the loss of dopants is to be supposed or can be perforated in order, for example, to allow introduction of dopants from the gas phase. The solution will not ordinarily flow out of holes less than 0.01 inches in diameter.

Figure 3:
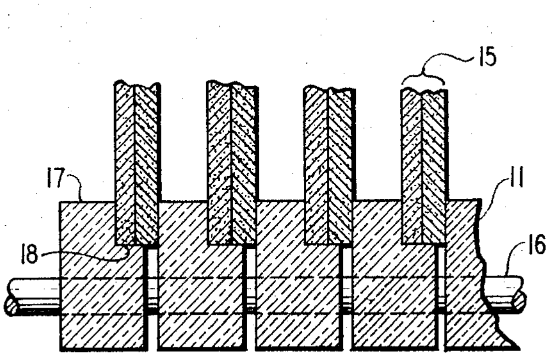
FIG. 3 is an elevational view in section of an exemplary clamping arrangement for supporting the substrate pairs with the desired interpair spacing.

FIG. 3 shows, in greater detail, an exemplary clamping arrangement used to hold the substrate pairs 15 in place. The clamping arrangement consists of a series of clamps 11 supported by a rod 16. Each clamp 11 has a lip 17, the thickness of which defines the interpair spacing, and a shoulder 18 which supports the pair 15 and is slightly thinner (e.g., 0.002 to 0.004 inches thinner) than the pair 15 so that when the assembly is held together the pairs 15 are fixed in place.

Materials

Liquid phase epitaxial (LPE) deposition of crystalline layers has been widely used in the growth of Group III–V compound semiconductors and their ternary combinations (i.e., such materials as GaP, GaAs, $GaAs_xP_{1-x}$ and $Ga_yAl_{l-y}As$). These materials find use, for example, in microwave devices and electroluminescent devices requiring either p-n junction wafers or wafers of only one conductivity type (e.g., Shottky barrier diodes). Materials in the gallium phosphide-gallium arsenide family have become especially important in the electroluminescent diode and laser diode field, materials of different composition emitting light of different wave length. These materials contain at least 80 percent by weight GaP and/or GaAs and include such materials as GaAsP and GaAlAs. Minor dopants are usually included in the crystalline material in a quantity not exceeding 1 percent by weight to modify and control such device parameters as conductivity type, conductivity and luminescent efficiency. Such species as S, Se, Te, Zn, Cd, Ge, Si, O and N have been used as dopants.

Example p-n junction gallium phosphide wafers for the production of electroluminescent red diodes were produced by the following process.

1. Selenium doped GaP wafers approximately one and one-half inches in diameter and 0.35 millimeters thick were loaded into a fused silica growth boat such as that depicted in FIG. 1. The interpair spacing was 2 millimeters. The reservoir of the boat was loaded with 175 grams of gallium, 7.5 grams of GaP crystals and 0.015 grams of tellurium. The growth boat was placed in a 3½ inch diameter tube furnace with an approximately 12 inch long uniform temperature zone and an atmosphere of $N_2$ was caused to flow through the furnace.

2. The furnace temperature was raised to 1030°C and held there for 30 minutes to allow the nutrient solution to homogenize, The quantities of the major constituents were chosen with reference to the gallium phosphide binary phase diagram to form a saturated solution at the above temperature.

3. The boat was rotated so as to cause the nutrient solution to flow in between the substrate pairs.

4. The furnace temperature was lowered to 900°C at a rate of 2 to 3 C per minute.

5. The boat was rotated back to its initial position to terminate growth and the furnace cooled to room temperature.

6. The depleted nutrient solution was removed and replaced with 175 grams of gallium, 8.5 grams of GaP crystals, 0.060 grams of zinc, and 0.4 grams of $Ga_2O_3$.

7. Steps 2 through 4 were repeated.

8. The boat was rotated back to its initial position and the boat cooled to room temperature with a 5 hour pause at 600°C and an 18 hour pause at 500°C for annealing.

9. The wafers were removed and fabricated into diodes. The resulting diodes possessed quantum efficiencies as high as 9 percent (number of emitted photons relative to the number of carriers injected across the junction). The layer thickness uniformity across each slice was typically ± 10 percent and the uniformity from slice-to-slice was typically ± 25 percent.

The dopant concentrations used and the heat treatment procedure of step 8 fall within the ranges disclosed in U.S. Pat. No. 3,690,964 issued Sept. 12, 1972 which teaches, among other things, a heat treatment in the range from 450° to 800°C for times between 3 and 60 hours.

What is claimed is:

1. A method for the simultaneous epitaxial growth of crystalline layers of Group III–V compound semiconductor on a plurality of crystalline substrate wafers comprising placing the wafers in a growth vessel together with but out of contact with a body of constituents which, when heated, form a nutrient solution and raising the temperature of the vessel to an initial temperature at least as great as would produce a saturated solution, causing the nutrient solution to contact the wafers, reducing the temperature of the vessel to a final temperature at a predetermined rate whereby epitaxial crystalline layers are grown and separating the nutrient solution and the wafers, wherein the wafers are arranged in the vessel vertically in pairs, each member of the pair contacting the other member of the pair at a broad face of the wafer, so as to essentially prevent flow of the nutrient solution in between the members of the pair, and each pair essentially parallel to and separated from a broad face of the adjacent pair by from 0.1 to 3 millimeters and the nutrient solution is caused to contact the wafers by simultaneously immersing the wafers in the nutrient solution.

2. A method of claim 1 in which the wafers are immersed in the nutrient solution by a change of orientation of the growth vessel causing the solution to flow in between the wafer pairs.

3. A method of claim 1 in which the growth vessel contains at least 10 substrate wafers.

4. A method of claim 1 in which the Group III–V compound semiconductor is at least 80 percent by weight of at least one material selected from the group consisting of gallium phosphide and gallium arsenide.

5. A method of claim 4 in which the Group III–V compound semiconductor is at least 99 percent by weight GaP.

6. A method of claim 4 in which the solution contains at least one member selected from the group consisting of S, Se, Te, Zn, Cd, Ge, Si, O and N in such quantity as to form less than one percent by weight of the crystalline layers.

7. A method of claim 6 in which the predetermined rate is less than 3 C per minute resulting in the deposition of a zinc and oxygen doped epitaxial layer on the substrate wafer.

8. A method of claim 7 in which the substrate wafer consists essentially of an n-type bulk grown portion and a tellurium doped epitaxial crystalline layer deposited from solution.

9. A method of claim 7 including heat treating the wafer at a temperature between 450° and 800°C for times between 3 and 60 hours subsequent to the formation of the zinc and oxygen doped epitaxial layer.

10. A method of claim 9 including electrically contacting the n-type portion of the wafer and the zinc-oxygen doped epitaxial layer so as to form a diode capable of emitting red light when suitably biased.

11. A method of claim 1 in which the body of constituents includes the nutrient solution.

12. A method of claim 1 in which the wafers are placed in the growth vessel prior to raising the temperature of the growth vessel to the initial temperature.

13. A method of claim 1 in which the nutrient solution and the wafers are separated by draining the solution away from the wafers.

14. A method of claim 13 in which the draining away of the solution is accomplished by changing the orientation of the growth vessel.

* * * * *

UNITED STATES PATENT OFFICE
CERTIFICATE OF CORRECTION

Patent No. 3,859,148 Dated January 7, 1975

Inventor(s) Larry R. Dawson, Orval G. Lorimor, Robert H. Saul

It is certified that error appears in the above-identified patent and that said Letters Patent are hereby corrected as shown below:

In the Abstract, line 12 change "Gap" to --GaP--.
Column 4, line 10, after "3" delete "C" and insert --Centigrade degrees--;
line 33, after "3" insert --hours--.
Column 4, line 56, (line 20 of Claim 1) after "0.1" insert --millimeters--.
Column 5, line 10, (line 2 of Claim 7) delete "C" and insert --Centigrade degrees--.

Signed and sealed this 15th day of April 1975.

(SEAL)
Attest:

RUTH C. MASON
Attesting Officer

C. MARSHALL DANN
Commissioner of Patents and Trademarks